UNITED STATES PATENT OFFICE.

GEORGE F. WILSON, OF EAST PROVIDENCE, RHODE ISLAND.

IMPROVED FERTILIZER OR MANURE.

Specification forming part of Letters Patent No. 39,519, dated August 11, 1863.

*To all whom it may concern:*

Be it known that I, GEORGE F. WILSON, of the town of East Providence, in the county of Providence, in the State of Rhode Island, have invented a new, useful, and improved compound for agricultural and fertilizing purposes, which I have called "Binitro-Phosphate of Lime;" and I hereby declare that the following is a full and exact description thereof and of my process of making the same, reference being had to the specimen herewith sent to the Patent Office.

I have for a number of years been engaged in extracting phosphoric acid or an acid phosphate of lime from bones for use in the arts. After this acid phosphate has been extracted there is left a residuary product consisting of sulphate of lime, carbon, and from two to twelve per cent. of the acid phosphate, which it will not pay to extract, and water. This residuary product I have called "bone sulphate of lime," and under this name have sold it extensively for agricultural purposes. I have sometimes expelled the water and sold it in the dry state under the same name. I have taken "green bones," so called, (bones deprived of flesh by boiling,) and placed them in closed retorts, similar to those used in the manufacture of gas, with the condensing apparatus attached, and applied a heat to them sufficient to carbonize the bones and to expel the gaseous and ammoniacal products of this distillation, the latter of which I have condensed and saved. I take the bone-coal thus obtained, and after grinding it and otherwise preparing it for the extraction of the phosphoric acid I treat it with its equivalent of sulphuric acid, which, combining with the lime of the bone-coal, liberates the phosphoric acid previously in combination with the lime. I now extract for the most part the phosphoric acid from the mass. The residuary product left after the extraction of the phosphoric acid (the bone sulphate of lime) I now dry thoroughly. This drying may be done in a great variety of ways, by exposure to the sun or by artificial heat. I now mix the products condensed from the burning or distillation of the bones, and to produce the bone-coal with the dried bone sulphate of lime obtained therefrom, as described above, and obtain from the double decomposition which ensues upon their admixture carbonate of lime and sulphate and phosphate of ammonia, and some other bodies of not any definite composition resulting from the combination of these acids with the alkaloids condensed with the ammoniacal products, and which may undoubtedly be considered as fertilizers. The fertilizers which I chiefly desire to attain by this process are the well-known substances sulphate and phosphate of ammonia.

Now, the more fully to enable others skilled in the art to make and use my invention, I will proceed to make a brief and explicit description of my processes detailed above.

I take a given quantity of bones, put them in retorts to which a condensing apparatus is attached, both of which are well known, close up the retorts, apply a strong heat, collect all the condensable products driven off the bones by heat, take the bone-coal thus obtained, apply an equivalent of sulphuric acid to it, extract most of the acid phosphate of lime from the mass so treated, dry the bone sulphate of lime obtained by this process, and then mix the above-described condensable products with this dried bone sulphate of lime.

It will be seen that by the above process I have replaced the phosphoric acid extracted from the bone-coal by sulphuric acid, or nearly so.

Now, what I claim as my invention, and desire to secure by Letters Patent, is—

The compound fertilizer obtained by the admixture of the above-described bone sulphate of lime with the ammoniacal and other bodies condensed in the distillation of bones.

GEO. F. WILSON.

Witnesses:
   E. N. HORSFORD,
   C. S. MERRICK.